United States Patent [19]

Beckwith et al.

[11] Patent Number: 5,136,696
[45] Date of Patent: Aug. 4, 1992

[54] HIGH-PERFORMANCE PIPELINED CENTRAL PROCESSOR FOR PREDICTING THE OCCURRENCE OF EXECUTING SINGLE-CYCLE INSTRUCTIONS AND MULTICYCLE INSTRUCTIONS

[75] Inventors: Robert F. Beckwith, Framingham; Neil J. Johnson, Burlington; Suren Irukulla, Holliston; Steven Schwartz, Sudbury; Nihar Mohapatra, Milford, all of Mass.

[73] Assignee: Prime Computer, Inc., Framingham, Mass.

[21] Appl. No.: 211,977

[22] Filed: Jun. 27, 1988

[51] Int. Cl.$^5$ .................................... G06F 9/22
[52] U.S. Cl. .................................... 395/375; 364/262.8; 364/262.4; 364/275.8; 364/263.1; 364/DIG. 1
[58] Field of Search ... 364/200 MS File, 900 MS File

[56] References Cited

U.S. PATENT DOCUMENTS

| | | | |
|---|---|---|---|
| 4,179,731 | 12/1979 | Yamazaki | 364/200 |
| 4,200,927 | 4/1980 | Hughes | 364/200 |
| 4,370,711 | 1/1983 | Smith | 364/200 |
| 4,399,507 | 8/1983 | Cosgrove | 364/200 |
| 4,454,580 | 6/1984 | Page | 364/20 |
| 4,477,872 | 10/1984 | Losq | 364/200 |
| 4,494,187 | 1/1985 | Simpson | 364/200 |
| 4,494,188 | 1/1985 | Nakane | 364/200 |
| 4,498,136 | 2/1985 | Sproul, III | 364/200 |
| 4,583,162 | 4/1986 | Prill | 364/200 |
| 4,679,141 | 7/1987 | Pomerene | 364/200 |
| 4,750,112 | 6/1988 | Jones | 364/200 |
| 4,760,519 | 7/1988 | Papworth | 364/200 |
| 4,764,861 | 8/1988 | Shibuya | 364/200 |
| 4,777,587 | 10/1988 | Case | 364/200 |
| 4,819,234 | 4/1989 | Huber | 364/200 |
| 4,847,753 | 7/1989 | Matsuo | 364/200 |
| 4,853,840 | 8/1989 | Shibuya | 364/200 |
| 4,860,197 | 8/1989 | Langendorf | 364/200 |
| 4,860,199 | 8/1989 | Langendorf | 364/200 |
| 4,872,109 | 10/1989 | Horst | 364/200 |
| 4,942,520 | 7/1990 | Langendorf | 364/200 |

OTHER PUBLICATIONS

A. Bandyopadhyay, "Combining both Micro-code & Hardwired Cont. in RISC", Comp. Arch. News, Sep. 1987, pp. 11–15.

D. S. Coutant et al, "Compilers for the New Generation of H–P Computers", H–P Journal, Jan. 1986, pp. 4–19.

R. D. Bernal, "Putting RISC Eff. to Work in CISC Arch.", VLSI Systems Des., Sep. 1987, pp. 46–51.

J. C. Circello, "Des. of the Edge 1 Supermini-comp.", VLSI Systems Des., May 1986, pp. 22–28.

J. Cho et al, "The Memory Arch. & the Cache & Mem. Mgmt. Unit . . . ", U. of Cal. Report #UCB/CSD 86/289, p. 5.

"4.2.2 Branch Target Cache", author and date unknown.

Primary Examiner—Thomas C. Lee
Assistant Examiner—Eric Coleman
Attorney, Agent, or Firm—Wolf, Greenfield & Sacks

[57] ABSTRACT

A pipelined central processor capable of executing both single-cycle instructions and multicycle instructions is provided. An instruction fetch stage of the processor includes an instruction cache memory and a prediction cache memory that are commonly addressed by a program counter register. The instruction cache memory stores instructions of a program being executed and microinstructions of a multicycle instruction interpreter. The prediction cache memory stores interpreter call predictions and interpreter entry addresses at the addresses of the multicycle intructions. When a call prediction occurs, the entry address of the instruction interpreter is loaded into the program counter register on the processing cycle immediately following the call prediction, and a return address is pushed onto a stack. The microinstructions of the interpreter are fetched sequentially from the instruction cache memory. When the interpreter is completed, the prediction cache memory makes a return prediction. The return address is transferred from the stack to the program counter register on the processing cycle immediately following the return prediction, and normal program flow is resumed. The prediction cache memory also stores branch instruction predictions and branch target addresses.

29 Claims, 8 Drawing Sheets

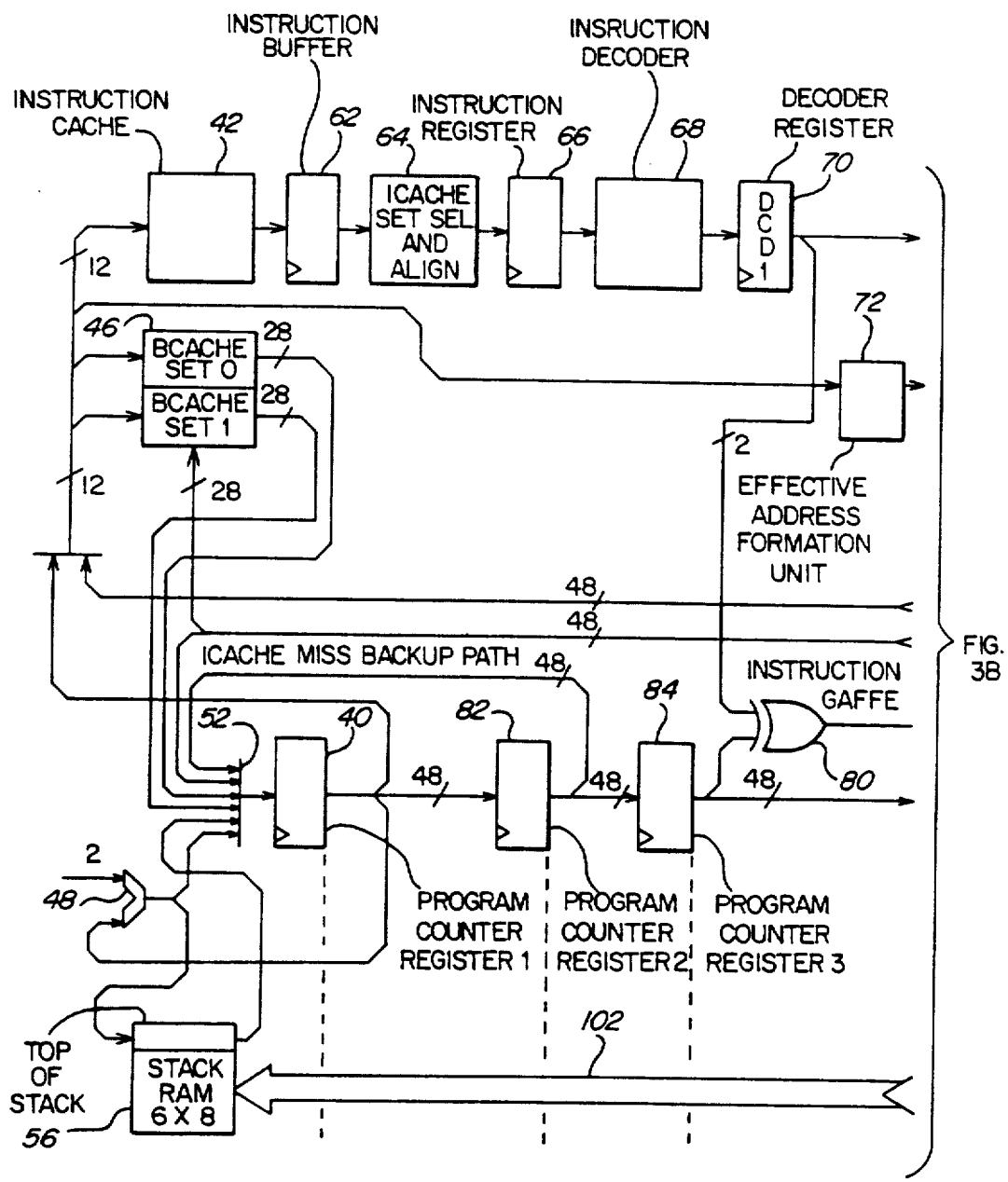

Fig. 4

| | $T_1$ | $T_2$ | $T_3$ | $T_4$ | $T_5$ | $T_6$ | $T_7$ | $T_8$ | $T_9$ | $T_{10}$ | $T_{11}$ | $T_{12}$ |
|---|---|---|---|---|---|---|---|---|---|---|---|---|
| PROGRAM COUNTER REGISTER (40) | $A_{S1}$ | $A_{S2}$ | $A_{M1}$ | $A_{I1}$ | $A_{I2}$ | $A_{I3}$ | $A_{S3}$ | $A_{B1}$ | $A_{T1}$ | $A_{T2}$ | $A_{M2}$ | $A_{S4}$ |
| INSTRUCTION BUFFER (62) | $S_0$ | $S_1$ | $S_2$ | $M_1$ | $I_1$ | $I_2$ | $I_3$ | $S_3$ | $B_1$ | $T_1$ | $T_2$ | $M_2$ |
| BRANCH CACHE (46) | N | N | $C, A_{I1}$ | N | N | R | N | $B, A_{T1}$ | N | N | N | N |
| STACK (56) | — | — | — | $A_{S3}$ | $A_{S3}$ | $A_{S3}$ | — | — | — | — | — | — |
| ADDER (48) | $A_{S2}=$ $A_{S1}+2$ | $A_{M1}=$ $A_{S2}+2$ | $A_{S3}=$ $A_{M1}+2$ | $A_{I2}=$ $A_{I1}+2$ | $A_{I3}=$ $A_{I2}+2$ | $A_{I4}=$ $A_{I3}+2$ | $A_{B1}=$ $A_{S3}+2$ | $A_{B2}=$ $A_{B1}+2$ | $A_{T2}=$ $A_{T1}+2$ | $A_{M2}=$ $A_{T2}+2$ | $A_{S4}=$ $A_{M2}+2$ | $A_{S5}=$ $A_{S4}+2$ |
| DATA SELECTOR (52) | 48 | 48 | 46 | 48 | 48 | 56 | 48 | 46 | 48 | 48 | 48 | 48 |

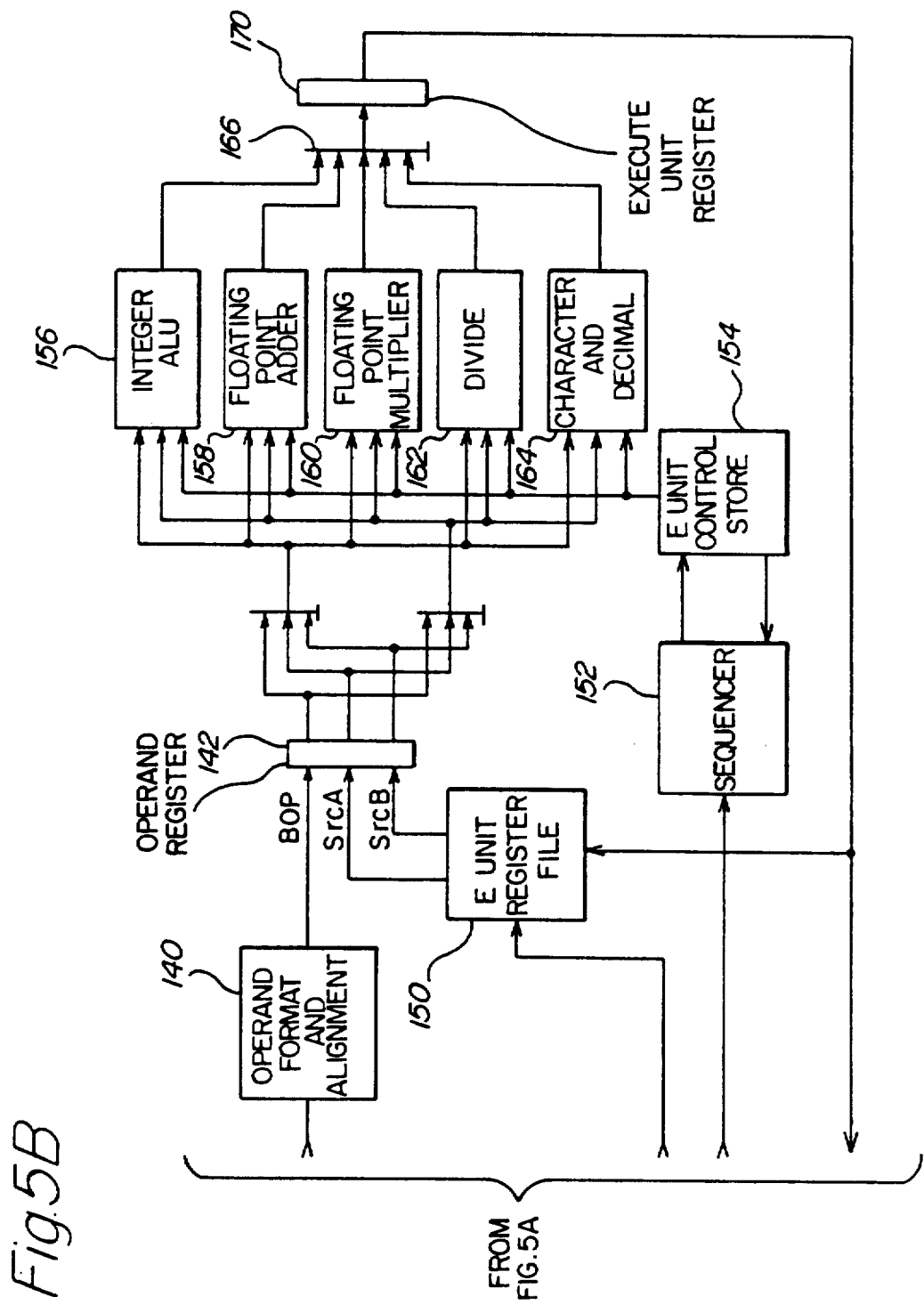

HIGH-PERFORMANCE PIPELINED CENTRAL PROCESSOR FOR PREDICTING THE OCCURRENCE OF EXECUTING SINGLE-CYCLE INSTRUCTIONS AND MULTICYCLE INSTRUCTIONS

FIELD OF THE INVENTION

This invention relates to high speed, pipelined digital processors and, more particularly, to pipelined central processors that utilize an instruction cache memory for storage of both program instructions and a multicycle instruction interpreter, and a cache memory for predicting multicycle instructions in the instruction flow.

BACKGROUND OF THE INVENTION

One form of architecture used in high speed computers is pipelining. A pipelined central processor is organized as a series of stages where each stage performs a dedicated function, or task, much like a job station on a factory assembly line. While pipelining does not decrease the time required to execute an instruction, it does allow multiple instructions in various phases of execution to be processed simultaneously. For an n stage pipeline, where one instruction enters the pipeline every cycle and a different instruction exits from the pipeline on every cycle, instructions appear to be executed at a rate equal to the cycle time. The actual execution time is n times the cycle time, as long as there are no dependencies between instructions in the program being executed.

Quite frequently, however, execution of one instruction requires data generated by another instruction. Execution of the instruction requiring the data must be held up until the instruction generating the data is completed. Typically, dependencies arise in (1) instruction sequencing, for example, a conditional branch; (2) operand address formation, for example, loading a register used in forming an address; and (3) execute data, for example, calculating data that is used in a later operation. The delay associated with each of these dependencies is dependent upon type of dependency, the length of the pipeline and the spacing between the two instructions in the program. The delay is increased for longer pipelines and/or close spacing between two instructions with dependencies. Several techniques have been developed to minimize the delay, including branch predictors and bypass paths which short circuit the normal pipeline data flow.

Many current computer architectures contain instructions which require several processor cycles to execute. This type of architecture is commonly known as a "complex instruction set computer" (CISC). The term CISC arose as the popularity of another type of architecture, "reduced instruction set computers" (RISCs), grew. The predominance of single cycle instructions and the lack of complex pipeline interlock detection hardware are characteristic of the RISC machines.

Program execution in a data processor usually includes fetching programmed instructions from memory and then performing the operation indicated by that instruction. An instruction decoder portion of the processor hardware is dedicated to transforming the ones and zeros in an instruction into signals used to control operations performed by other parts of the processor.

To execute single-cycle instructions, the instruction decoder can be a simple lookup table addressed by the instruction. The table width is determined by the required number of control signals. The table can be implemented using logic gates or memory such as RAM or ROM.

The execution of multicycle instructions requires a control sequencer which can be implemented using either logic gates or memory. Computers with only a few multicycle instructions may utilize the logic approach. As the number of multicycle instructions increases, the memory-based design is usually chosen, since the logic approach becomes very cumbersome. The memory-based design is usually called microcode. Most current computer designs, with the exception of RISC machines, rely heavily upon microcode and microprograms to provide the desired processor functionality. The incorporation of microcode into a machine design requires a memory in which to store the microcode, usually called the control store, and a sequencer to provide flow control for the microcode.

Pipelined computers typically include at least an instruction fetch and decode stage and an execute stage. Microcode has been incorporated into the execute stage for handling of multicycle instructions. When a multicycle instruction is decoded, the microcode in the execute stage sequences through the steps of the complex instruction, and the remainder of the pipeline is placed on hold. Disadvantages of the microcode approach include the additional hardware required for implementing the microcode and somewhat slower operation due to memory latency involved in execution of the microcode.

Other approaches to the execution of multicycle instructions have included the storage of millicode instructions in memory, as described by D. S. Coutant et al in *Hewlett Packard Journal*, Jan. 1986, pp. 4–19. Still another approach described by A Bandyopadhyay et al in "Combining Both Micro-code And Hardwired Control in RISC," *Computer Architecture News*, Sep. 1987, pp. 11–15, involves the incorporation of a bit into each instruction that indicates whether the instruction is single cycle or multicycle. When the bit indicates a multicycle instruction, microcode is called. The disadvantage of both these approaches is a delay in operation of one or two machine cycles, since the instruction is not identified as a multicycle instruction until it has been decoded. Thus, the subsequent cycle must wait until the preceding instruction is decoded.

The use of a branch cache prediction mechanism for providing more efficient pipelined processor operation is described in U.S. Pat. No. 4,777,594 issued Oct. 11, 1988 and assigned to the assignee of the present application. Without a prediction mechanism, a pipelined processor may function slowly on a branch instruction. A branch instruction requires branching to an instruction out of the normal sequence. However, earlier pipeline stages have begun processing the next instruction in the normal sequence. When this occurs, flushing of the pipeline and restarting is required, and processing is delayed. The branch cache memory is associated with instruction fetching and predicts the next address after a branch instruction based on past operation. Thus, when a branch instruction is encountered in the program, the branch cache predicts the target address of the branch instruction, and the next instruction address in the normal sequence is replaced with the branch target address. As a result, pipeline operation proceeds without interruption.

It is a general object of the present invention to provide improved digital processing apparatus.

It is another object of the present invention to provide a pipelined central processor capable of high speed instruction processing.

It is a further object of the present invention to provide a high performance, pipelined central processor capable of executing both single-cycle instructions and multicycle instructions.

It is yet another object of the present invention to provide a high performance, pipelined central processor that is simple in construction and low in cost.

It is still another object of the present invention to provide a high performance central processor that utilizes a cache memory for predicting multicycle instructions and for calling an instruction interpreter located in an instruction cache memory.

SUMMARY OF THE INVENTION

According to the present invention, these and other objects and advantages are achieved in a high-performance pipelined central processor capable of efficiently executing both single-cycle instructions and multicycle instructions. The pipelined processor includes at least an instruction fetch stage, an instruction decode stage, an address formation stage, an operand stage, an execute stage and a write stage. The instruction fetch stage includes an instruction cache memory and a prediction cache memory that are commonly addressed. Instructions of the program being executed are held in the instruction cache memory. An instruction interpreter for executing multicycle instructions is also located in the instruction cache memory.

The instruction interpreter includes a sequence of microinstructions for executing each multicycle instruction. The entry address for the interpreter is located in the prediction cache memory. When a complex instruction occurs in the program, the prediction cache memory makes an interpreter call prediction based on the instruction address and points to the interpreter entry address. The program return address is pushed onto a program counter stack, and the interpreter entry address is loaded into the program counter. The microinstructions of the interpreter are fetched sequentially from the instruction cache memory by the program counter. When the interpreter is completed, the prediction cache memory makes a return prediction, and the program return address is transferred from the stack to the program counter. By use of the prediction cache memory, calls to the interpreter and returns from the interpreter are performed without loss of processing cycles.

According to the invention, there is provided digital processing apparatus for executing stored program instructions including single-cycle instructions and multicycle instructions during multiple processing cycles. The processing apparatus comprises instruction memory means for providing the program instructions in response to program addresses and for providing microinstructions of a multicycle instruction interpreter in response to microinstruction addresses, prediction means responsive to different ones of the program addresses for making predictions of multicycle instructions and predictions of single cycle instructions, control means for providing consecutive program addresses to the instruction memory means for accessing the program instructions in response to predictions of single cycle instructions and for providing consecutive microinstruction addresses to the instruction memory means in response to each prediction of a multicycle instruction until completion of the multicycle instruction interpreter, means for executing the program instructions and the microinstructions and means for validating the predictions and for updating the prediction means when the predictions are incorrect.

In a preferred embodiment, the predictions include interpreter call predictions and interpreter return predictions, and the prediction means includes a cache memory for storage and readout of each of the call predictions and an associated entry address at the program address for which the call prediction is made and for storage and readout of each of the return predictions at the microinstruction address for which the return prediction is made. The prediction cache memory can further include means for storage and readout of branch instruction predictions. Each branch instruction prediction is stored with a branch target address at the program address for which the branch prediction is made. When a branch prediction is made, the target address is loaded into the program counter for addressing of the instruction cache memory.

The above-described control means preferably includes program counter means for holding a current address for accessing the instruction memory means on each processing cycle and for incrementing the current address on consecutive processing cycles, stack memory means coupled to the program counter means, control logic means responsive to each of the call predictions for loading a return program address from the program counter means into the stack memory means and selector means responsive to each of the call predictions for loading the entry address into the program counter means and responsive to each of the return predictions for transferring the return program address from the stack memory means to the program counter means.

BRIEF DESCRIPTION OF THE DRAWINGS

For a better understanding of the present invention together with other and further objects, advantages and capabilities thereof, reference is made to the accompanying drawings which are incorporated herein by reference and in which:

FIGS. 3a, 3b and 3c are a block diagram that illustrates program sequencing of the pipelined processor;

FIG. 4 is a timing diagram that illustrates an example of the operation of the instruction fetching unit of FIG. 2; and FIGS. 5a and 5b are a block diagram that illustrates the portion of the pipelined processor downstream from the instruction fetching unit.

DETAILED DESCRIPTION OF THE INVENTION

A pipelined processor incorporating the present invention is designed as an eight-stage pipeline. Execution of each machine instruction is divided into a minimum of eight steps which are performed in eight consecutive clock cycles. When an instruction enters stage two of the pipeline, the following instruction enters stage one. In an ideal situation, the staging of instructions continues until the pipeline is full, which permits eight instructions to be processed concurrently. When the pipeline is full, an instruction completes execution every clock cycle. In actual operation, cache misses, dependencies, incorrect predictions and other exceptional conditions cause the pipeline operation to be interrupted, so that the average instruction time is about three clock cycles. In a preferred embodiment, the clock cycle is eighteen nanoseconds. It will be understood that different clock cycle times can be utilized, depending on the hardware speed and the processing requirements.

Figure 1:
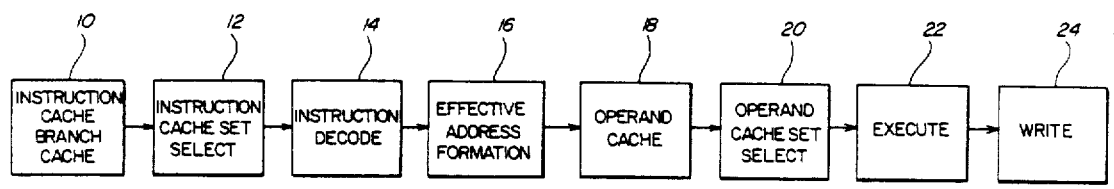
FIG. 1 is a simplified block diagram that illustrates the pipelined processor architecture of the present invention.

A simplified block diagram of the eight stage pipeline processor is shown in FIG. 1. A first pipeline stage 10 contains an instruction cache memory, a branch cache memory and the hardware to address the cache memories, as described hereinafter. The instruction cache stores the instructions for the program being executed, and also stores an interpreter for multicycle instructions. The branch cache memory is a mechanism for predicting branch instructions and multicycle instructions, based on the instruction address and the past history of that instruction address. In the present embodiment, the instruction cache is a two-way set associative cache. A second pipeline stage 12 performs instruction cache set selection and generates a hit/miss signal. If a single set instruction cache is utilized, the second pipeline stage 12 can be omitted from the processor. In a third pipeline stage 14, the instruction is decoded to provide control signals and addresses for the remainder of the processor.

A fourth pipeline stage 16 determines the effective address of the operand by performing up to a three way addition of a base register plus an index register plus a displacement. A fifth pipeline stage 18 is an operand cache, and a sixth pipeline stage 20 performs an operand cache set selection. The operand cache, which stores the operands for the program, includes multiple sets and is virtually addressed. The operand cache set select stage 20 performs operand cache hit/miss determinations, set selection and data alignment. If a single set operand cache is utilized, the sixth pipeline stage 20 can be omitted from the processor. An execute stage 22 performs the operation specified by the instruction, and a write stage 24 stores the results determined in the execute stage 22.

Figure 2:
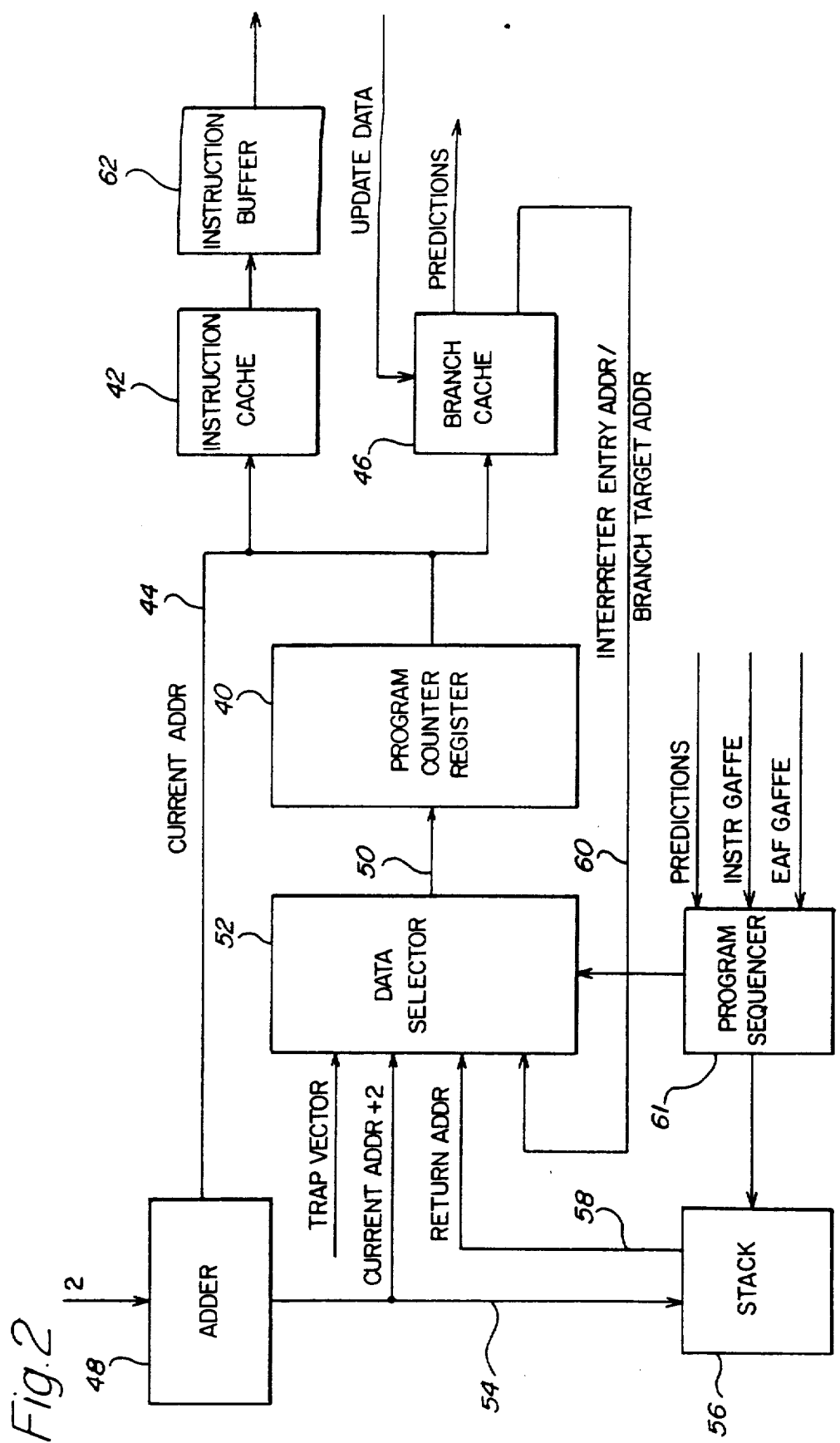
FIG. 2 is a simplified block diagram that illustrates the instruction fetching unit of the pipelined processor.

A more detailed block diagram of the instruction portion of the pipelined processor is shown in FIG. 2. In pipelined processor architecture, each stage of the pipeline typically includes combinatorial logic followed by a latch, or register, at its output for holding the results. The outputs of each register supply inputs to the following stage. Referring now to FIG. 2, a program counter register 40 is used to fetch instructions from an instruction cache memory 42. The outputs of program counter register 40 are coupled by a bus 44 to the address inputs of instruction cache 42. The bus 44 also couples the outputs of the program counter register 40 to address inputs of a branch cache memory 46 and to inputs of an adder 48.

The program counter register 40 receives inputs on a bus 50 from a data selector 52. Data selector 52 loads the program counter register 40 with the address of the instruction to be accessed in instruction cache 42. The program counter register 40 input is selected from one of four sources. The outputs of adder 48 are coupled by a bus 54 to a first set of inputs of data selector 52. When this input is selected, program counter register 40 is incremented by a predetermined number, typically two, after each instruction. Program counter register 40 and adder 48 together function as a program counter for sequencing through addresses of program instructions. Bus 54 also couples the output of adder 48 to a stack memory 56. The output of stack 56 is coupled by a bus 58 to a second set of inputs of data selector 52. When the stack 56 output is selected by data selector 52, the top entry on stack 56 is loaded into program counter register 40 as the address of the next instruction. The output of branch cache 46 is coupled by a bus 60 to a third set of inputs of data selector 52. When the output of branch cache 46 is selected, a predicted instruction address other than the next address is predicted, as described in detail hereinafter. A fourth set of inputs to data selector 52 is a trap vector that is utilized in the event of certain faults during operation.

A program sequencer 61 receives prediction types from the output of branch cache 46 and supplies control signals to data selector 52 and to stack 56. The program sequencer 61 controls storage of return addresses in stack 56 and selection of the appropriate instruction address by data selector 52.

Figure 3B:
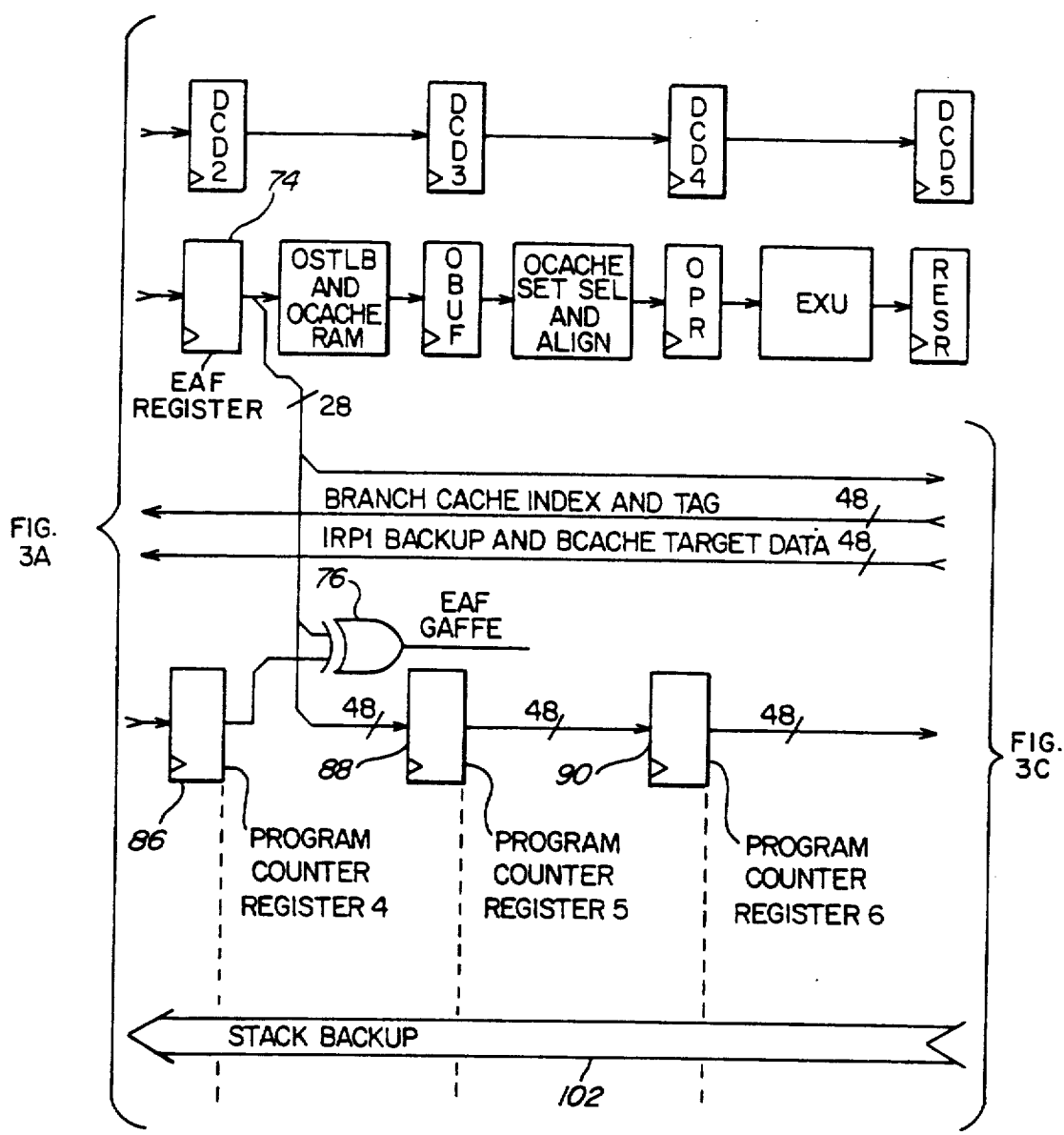
Figure 3C:
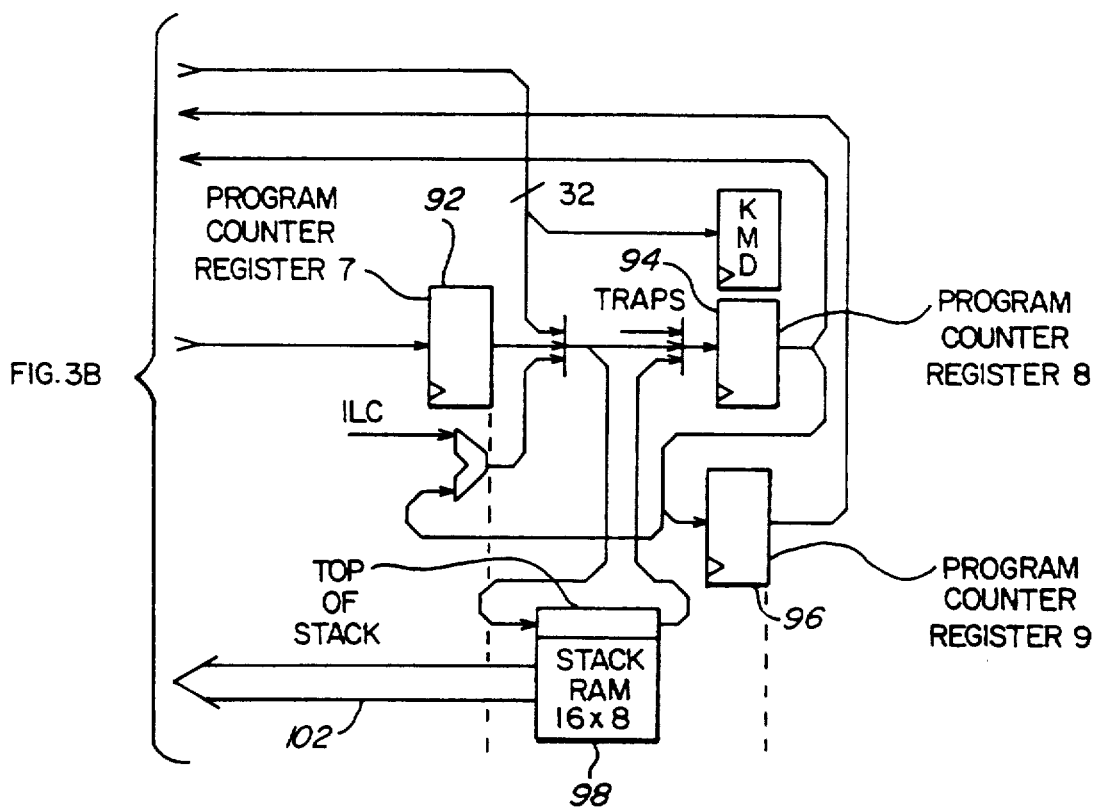
Figure 5A:
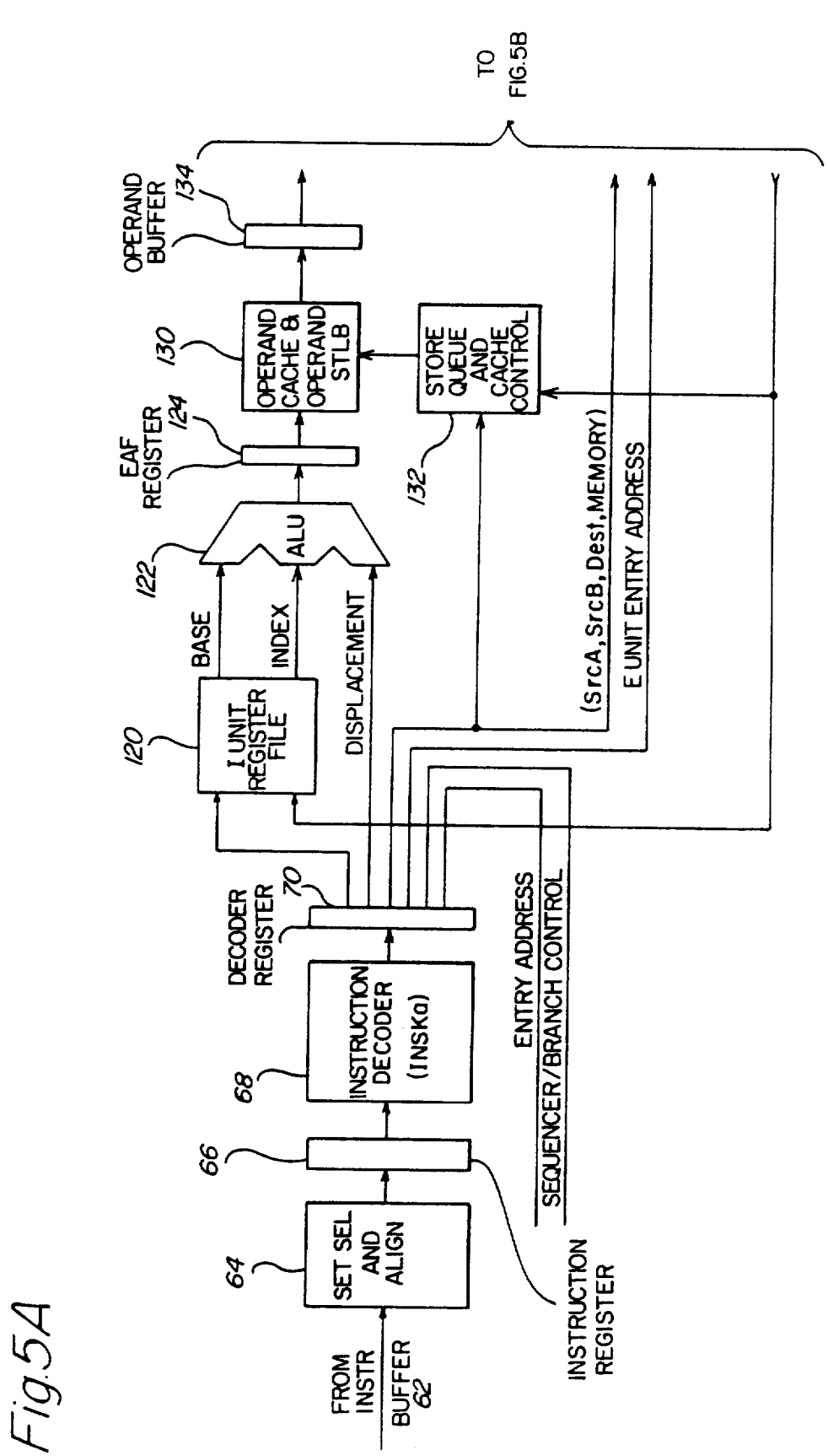

The output of the instruction cache 42 is held in an instruction buffer 62 that has its outputs coupled to to an instruction cache set select and align unit 64 (FIG. 3). The output of unit 64 is coupled through an instruction register 66 to an instruction decoder 68. The set select and align unit 64 determines cache hit or cache miss and selects one output of the multiset instruction cache memory. Instructions to be executed are passed in sixteen-bit parcels from the instruction cache 42 to the instruction decoder 68 through the set select and align unit 64. The instruction decoder 68 assembles the instruction parcels into complete instructions and then extracts all the information required to successfully complete execution of the instruction. Most of the information is contained in RAM tables within the instruction decoder 68. The outputs of instruction decoder 68 are coupled through a decoder register 70 to the remainder of the pipelined processor.

Instruction sequencing has been described above in connection with program counter register 40 used for addressing of the instruction cache 42 and the branch cache 46. The instruction sequencer for the pipelined processor of the present invention includes one program counter register per stage of the pipelined processor. As shown in FIG. 3, the program counter register 40 is associated with the first pipeline stage 10. Stages 2 through 8 of the pipelined processor contain program counter registers 82, 84, 86, 88, 90, 92 and 94, respectively. Program counter register 94 associated with write stage 24 is the real program counter. There is also provided a program counter register 96 that is used to back up program counter register 94. The contents of program counter register 40 are cycled through the stages of the pipelined processor in phase with the corresponding instructions.

The processor of the present invention maintains two physical stacks 56 and 98 that are used in implementing pipeline flushing. Stack 56 is associated with the instruction fetch stage 10 and is used to push or pop return addresses to or from program counter register 40. Stack 98 is associated with the write stage 24 and is used to push or pop return addresses to or from program counter register 94. Stacks 56 and 98 are coupled together by a bus 102. When a pipe flush condition occurs, the entire contents of the write stage stack 98 are transferred via bus 102 into the instruction prefetch stage stack 56. Hence, the predicted stack operations are undone and the integrity of the stack is maintained.

The branch cache 46 is used to predict both branch instructions and multicycle, or complex, instructions. Thus, although the cache memory 46 is called a branch cache, it is not limited to predicting branch instructions. The branch cache 46 is also capable of call predictions and return predictions as described in detail hereinafter. The use of a branch cache for prediction of branch instructions is disclosed in the aforementioned U.S. Pat. No. 4,777,594. When the cache 46 predicts a multicycle instruction, a call is made to an instruction interpreter stored in the instruction cache 42. The instruction interpreter is a series of microinstructions utilized for executing a multicycle instruction. The instruction interpreter stored in the instruction cache 42 is analogous in function to the microcode used on prior art processor designs. However, the instruction interpreter utilized in the processor of the present invention provides improved performance relative to architectures where a microsequencer is part of the execution stage of the pipeline.

The instruction cache 42 stores both the normal program instruction sequence and the instruction interpreter. This is possible because the two sets of instructions are accessed at different times. When a normal program instruction sequence is being accessed, the interpreter is not required. When a multicycle instruction is predicted by the branch cache 46, the normal instruction flow is delayed while the steps of the complex instruction are executed. Therefore, the available bandwidth of the entire pipeline is more efficiently utilized.

The branch cache 46 is addressed by the program register 40 on every processor cycle. Each branch cache location contains two bits which indicate prediction type. Possible prediction types are (1) normal prediction, (2) branch prediction, (3) interpreter call prediction and (4) interpreter return prediction. In the case of a branch prediction, the branch cache 46 stores a sixteen-bit branch target address. In the case of an interpreter call prediction, the branch cache 46 stores a sixteen bit interpreter entry address. No data is stored with an interpreter return prediction or a normal prediction. Sixteen bits are adequate since the branch target address or the interpreter entry address is normally located in the same memory segment as the calling instruction. If this condition is not met, the branch cache output can be expanded to include more than sixteen bits.

In an important feature of the invention, the predictions made by branch cache 46 are based on instruction addresses rather than the instructions themselves. Predictions are stored in the branch cache 46 based on past operation of the system. Each prediction is stored in the branch cache 46 at the same address as the corresponding instruction is stored in the instruction cache 42. The branch cache 46 predicts that certain program addresses contain multicyle instructions, branch instructions, etc. The ability to make predictions from instruction addresses provides a considerable time saving and reduces processing time. With the predictions from branch cache 46, entry to the instruction interpreter, return from the instruction interpreter and branches can be performed on the processor cycle immediately following the prediction. Without the branch cache 46 for making predictions, one or more processing cycles would be lost, since it would be necessary to wait until the instruction was decoded before accessing the interpreter or the branch target.

In the case of a normal prediction, operation continues in a normal program mode, and the program counter register 40 is incremented by the adder 48. In the case of a branch prediction, the branch target address is loaded into the program counter register 40 through the data selector 52, and the branch target instruction is addressed on the processor cycle immediately after the instruction for which the branch was predicted.

In the case of a multicycle instruction, the branch cache 46 stores a call prediction and an entry address of the instruction interpreter. The entry address may be different for each different type of multicycle instruction. The interpreter entry address is loaded into program counter register 40 through data selector 52. The entry address of the instruction interpreter is placed in program counter register 40 on the processor cycle immediately after the instruction that was predicted to be a multicycle instruction. The processor then enters an interpreter mode, and microinstructions of the interpreter are accessed consecutively. The microinstructions of the instruction interpreter are sequenced in the same manner as a normal instruction sequence. The program counter register 40 is incremented by the adder 48 after each microinstruction. When the interpreter entry address is loaded from the branch cache 46 into program counter register 40, the return address of the next normal instruction is pushed onto stack 56. The stack pointer is incremented, and an interpreter mode bit is set. As described hereinafter, the interpreter mode bit is derived from the branch cache 46 and indicates whether the instruction is a normal program instruction or an interpreter microinstruction. The return address is the current address in program counter register 40 incremented by adder 48 and appears at the output of adder 48 on bus 54. Normal instruction sequencing is delayed during addressing of the instruction interpreter.

During sequencing through the microinstructions of the interpreter, the branch cache 46 is being addressed. Branch cache 46 predicts completion of the interpreter by means of a return prediction. The return prediction causes the return address at the top of stack 56 to be loaded into program counter register 40 through data selector 52. The stack pointer is decremented, and the interpreter mode bit is reset if the stack pointer is zero. As a result, the program returns to normal instruction flow until the next branch instruction or multicycle instruction is encountered. The return to normal instruction flow occurs on the processing cycle immediately after the last microinstruction of the interpreter.

The instruction interpreter that is stored in instruction cache 42 can include subroutines. Subroutine calls within the instruction interpreter are handled in the same manner as calls to the interpreter. When a subroutine is called during execution of the interpreter, the subroutine call is predicted by the branch cache 46 as a call prediction. The branch cache 46 stores a subroutine entry address at the location of the subroutine call prediction. The return address of the next microinstruction is pushed onto the top of the stack 56, the stack pointer is incremented, and the subroutine entry address is loaded from the branch cache 46 into the program counter register 40 through data selector 52. When the subroutine is completed, branch cache 46 makes a subroutine return prediction, the stack pointer is decremented, and the subroutine return address is transferred from stack 56 through data selector 52 to program counter register 40. The instruction interpreter is then completed, and an interpreter return prediction is made. At this time, the interpreter return address is transferred from the stack 56 to the program counter register 40 for return to the normal program flow. It will be understood that the interpreter can include nested subroutines that are limited in number only by the capacity of the stack to store the return addresses.

In order to keep the normal program mode separate from the interpreter mode, the branch cache 46 is divided into two sections: a normal program section and an interpreter section. The two sections are addressed by the interpreter mode bit, which is derived from the branch cache output on previous instructions. During normal program flow, the interpreter mode bit is reset. When an interpreter call is made due to the branch cache 46 predicting a multicycle instruction, the interpreter mode bit is set. The interpreter mode bit remains set during subsequent microinstructions of the interpreter and is reset upon a return from the interpreter. The interpreter mode bit is one of the address bits supplied to the branch cache 46. The normal program section of the branch cache 46 (addressed by the reset state of the interpreter mode bit) contains program branch predictions and interpreter call predictions. The interpreter section of the branch cache 46 (addressed by the set state of the interpreter mode bit) contains the following types of predictions.

1. Interpreter branch predictions (branches within the interpreter).
2. Interpreter subroutine calls.
3. Interpreter returns (either return to normal program mode or return from interpreter subroutines).

While the program predictions and interpreter predictions are maintained in separate sections of the branch cache 46, the outputs of the branch cache 46 are differentiated only as to normal prediction, branch prediction, interpreter call prediction and interpreter return prediction.

In addition to the above-described operations that occur when a prediction is made, the following additional operations can be performed on the program counter register 40.

1. The program counter register 40 can be held in the same state for two or more processing cycles.
2. In a flush operation, the program register 40 is loaded with the contents of the write stage program register as described hereinafter.
3. In a cache miss operation, the program register 40 is loaded with the address values in the second stage program counter register 82.

In a preferred embodiment, the instruction cache 42 includes a virtually addressed two-way set associative cache with 16K bytes per set and a two way set associative segment table look-aside buffer with 512 entries per set. The instruction cache keeps a local copy of the most recently-used instructions in high speed RAM. The branch cache 46 is a two way set associative cache with 1K entries per set. Of the 1K entries, 512 are reserved for program branch and interpreter call instructions, and the other 512 are reserved for interpreter branch, interpreter subroutine call and interpreter return instructions, as described above.

Operation of the instruction fetching unit shown in FIG. 2 and described hereinabove is now illustrated with reference to FIG. 4, which indicates the states of program counter register 40, instruction buffer 62, branch cache 46, stack 56, adder 48 and data selector 52 for consecutive processing cycles $T_1$, $T_2$, $T_3$, etc. During processing cycle $T_1$, instruction buffer 62 contains a single-cycle instruction $S_0$ and program counter register 40 contains program address $A_{S1}$ of the next single-cycle instruction. During the next processing cycle $T_2$, the single-cycle instruction $S_1$ is loaded into instruction buffer 62, and the next program address $A_{S2}$ is held in program counter register 40. During processing cycles $T_1$ and $T_2$, normal predictions N are made by branch cache 46, and the adder 48 increments the program counter register 40 by two counts on each processing cycle.

During processing cycle $T_3$, single-cycle instruction $S_2$ is moved into instruction buffer 62, and the next program address $A_{M1}$ is moved into program counter register 40. Address $A_{M1}$ corresponds to a multicycle instruction $M_1$. The branch cache 46 makes an interpreter call prediction C and provides an interpreter entry address $A_{I1}$. As a result of the call prediction, the data selector 52 selects inputs from branch cache 46 on processing cycle $T_4$. The entry address $A_{I1}$ is loaded from branch cache 46 through data selector 52 to program counter register 40, and a return address $A_{S3}$ (which equals address $A_{M1}+2$) is pushed onto stack 56. During processing cycles $T_5$ to $T_7$, the interpreter microinstructions $I_1$, $I_2$ and $I_3$ are addressed consecutively by means of the adder 48 incrementing the program counter register 40. During processing cycle $T_6$, branch cache 46 makes a return prediction R. As a result of the return prediction, the data selector 52 selects inputs from stack 56. On subsequent processing cycle $T_7$, the return address $A_{S3}$ at the top of stack 56 is transferred to program counter register 40, and normal program sequencing continues.

During processing cycle $T_8$, the program address $A_{B1}$ in program counter register 40 is a branch instruction $B_1$, and the branch cache 46 provides a branch prediction B and a branch target address $A_{T1}$. As a result of the branch prediction, the data selector 52 selects inputs from branch cache 46, and on subsequent processing cycle $T_9$, the branch target address $A_{T1}$ is transferred from branch cache 46 to program counter register and normal program sequencing continues.

During processing cycle $T_{11}$, an address $A_{M2}$ corresponding to a multicycle instruction $M_2$ is loaded into program counter register 40. In this case, the branch cache 46 incorrectly makes a normal prediction N rather than an interpreter call prediction C. The handling of incorrect predictions is described hereinafter.

Thus far, it has been assumed that the branch cache 46 contains valid information for making predictions of branch instructions and interpreter call predictions and return predictions. The branch cache is a means for predicting or guessing the occurrence of branch instructions and multicycle instructions in a program, based on past program operation. The predictions reduce processing time when they are correct. In each instance, the prediction must be validated by subsequent comparison with the actual program instruction after the instruction is accessed. When an incorrect prediction is made, the branch cache 46 must be updated to reflect the correct information, and the pipeline must be flushed so that the incorrectly predicted operation can be performed correctly. The updated information increases the probability that correct predictions will be made during future operations.

During the first cycle after a program or a program segment is called from memory, no predictions are contained in the branch cache 46. In this situation, incorrect predictions will be made for every branch instruction and multicycle instruction. Updates of the branch cache 46 are performed in each case of an incorrect prediction. Then, on subsequent program cycles, predictions are correctly made.

There are three possible mistakes that can be made by the branch cache 46: (1) a bad prediction; (2) an effective address formation (EAF) gaffe; or (3) an instruction gaffe. A bad prediction occurs when the branch cache 46 incorrectly predicts the result of a conditional branch instruction. Bad predictions can only be validated in the execution unit of the pipelined processor. In the execute unit, the condition codes are tested to determine if the branch cache 46 predicted the correct operation. EAF gaffes are detected by comparing the branch target address generated by the effective address formation unit 16 with the branch target address predicted by the branch cache 46. EAF gaffe detection is performed in the stage immediately following the effective address formation stage 16. Instruction gaffes are detected by comparing the instruction type from the decode stage 14 with the instruction type predicted by the branch cache 46. For example, if the branch cache 46 predicts a branch on a nonbranch instruction, then an instruction gaffe is detected. The instruction gaffe detection is determined in the stage immediately following the instruction decode stage 14. The entry address of the interpreter is available at the output of the decode stage 14. The predicted entry address and the decoded entry address are compared to determine validity.

The program counter registers 40, 82, 84, 86, 88, 90, 92 and 94 that are associated with each stage of the pipeline describe the state of the instruction within each stage. Each program counter register contains a address field and a status field for each instruction in the pipeline. As an instruction moves down the pipeline, its status and address fields move with it.

The address field of the program counter register is used for different purposes in different stages of the pipeline. In the first stage, program counter register 40 addresses the instruction cache 42. In stages two through four of the pipeline, the program counter register address field is used for gaffe detection. Stages five through seven use the address field to send branch targets to program register counter 94. In the write stage 24, the address field is the real program counter which can be incremented by the instruction length code, loaded with branch/call targets, pushed/popped and loaded with trap vectors. In all stages, the program counter register represents the next address of each corresponding instruction in the pipeline.

The status field bits carried through the program counter registers are described below.

1. The alignment bit indicates the alignment of the associated instruction. The alignment bit is equal to zero when the instruction ends on the 32-bit boundary (aligned and otherwise is set to one).

2. The prediction bit indicates that the associated instruction has caused a branch cache prediction.

3. The least-recently used bit is used in the branch cache update/invalidate algorithm.

4. The history bit is used in the branch cache update/invalidate algorithm.

5. The trap bits cause an instruction to be trapped, either when it reaches the write stage or after it is completed in the write stage.

6. The serialization bit causes the pipeline to be flushed after the tagged instruction completes in the write stage.

7. The nullification bit causes the tagged instruction to be flushed from the pipeline and retried when the tagged instruction reaches the write stage.

8. The valid bit flags a stage as containing an instruction. When the bit is clear, it means that the stage is empty. Empty stages occur after each pipeline flush.

9. The gaffe bit is set by the gaffe hardware as described hereinafter. The gaffe bit causes the branch cache 46 to be updated when the tagged instruction reaches the write stage 24 and causes the tagged instruction to be serialized so that the pipeline is flushed after the instruction is completed.

10. The interpreter mode bit is used selectively put any stage of the pipeline in the interpreter mode. The interpreter mode bit comes from the branch cache 46.

11. The instruction length code (ILC) is associated with every instruction in the pipeline. Its value is used to increment program counter register 94 when an instruction is completed in the write stage 24.

12. The two-bit operation code tags each instruction as being a branch, call, return or other instruction. The operation code is set by the branch cache 46 and is used to validate branch cache predictions (instruction gaffe and conditional branch verification). In the EAF stage 16 of the pipeline, the operation code is used for instruction gaffe detection. After EAF stage 16, the bits of the operation code are used to pass the operation code from the decode stage 14 down the pipeline.

13. The set select bit identifies the set to invalidate on a branch cache gaffe or bad prediction.

Referring again to FIG. 3, the output of decoder register 70 is connected to one set of inputs of a comparator 80. When a call prediction or a branch prediction is made by the branch cache 46, the entry or target address is loaded into the address field and the prediction type is loaded into the operation code bits of the status field of program counter register 40. The prediction and the entry or target address are then sequenced through program counter registers 82 and 84 to a second set of inputs of comparator 80. Passing the branch cache 46 outputs program counter registers 40, 82 and 84 insures that the inputs are provided to comparator 80 simultaneously. Instruction gaffe detection is performed by comparing the operation code (instruction type) from instruction decoder 68 with the operation code (prediction type) from program counter register 84. When the instruction type and the prediction type agree, the branch cache prediction was correct, and operation can continue. When these values do not agree, the branch cache 46 made an erroneous prediction, and the comparator 80 supplies an instruction gaffe signal which sets the gaffe bit in program counter register 86. When an interpreter call prediction is made by the branch cache 46, the comparator 80 also compares the entry address predicted by branch cache 46 with the entry address supplied from decoder 68. When these addresses do not agree, an instruction gaffe signal is provided.

The target address of a branch instruction is not available for validation until the output of the effective address formation stage 16. The output of decoder register 70 is coupled to effective address formation unit 72, and the effective address is stored in EAF register 74. The output of EAF register 74 is coupled to one set of inputs of a comparator 76. The output of stage four program counter register 86 is coupled to the other set of inputs of comparator 76. The program counter registers 40, 82, 84 and 86 insure that the branch target address prediction is supplied to the comparator 76 at the same time as the effective address from EAF register 74. EAF gaffe detection is performed by comparing the branch address from the EAF register 74 with the address field of program counter register 86. When the two inputs to comparator 76 are equal, the branch cache 46 correctly predicted the target address of the branch instruction, and operation can continue. When the inputs to comparator 76 are not equal, an incorrect target address prediction was made, and an EAF gaffe signal is provided.

If a branch prediction, call prediction or return prediction by the branch cache 46 was incorrect, the corresponding instruction is invalidated, but execution of the instruction is completed. It is necessary to complete the instruction in order to determine the correct result for updating the branch cache 46. In the case of a conditional branch instruction, the condition is not determined until the execute stage 22.

The write stage 24 contains the real program counter register 94 and is responsible for advancing the CPU from its current state to its next state for each instruction executed. The write stage 24 stores all operand results, sets condition codes and loads the program counter register 94 with the next instruction address. When previous stages of the pipelined processor make an error, it is the responsibility of the write stage 24 to flush the pipeline. Flushing of the pipeline consists of invalidating all the instructions in the first seven stages of the pipeline and loading the contents of program counter register 94 into program counter register 40. The most common causes of pipeline flushes are bad branch cache predictions and gaffes.

Two types of pipeline flushing are utilized. In serialization, the instruction causing the flush is completed. In nullification, the instruction causing the flush is not completed. In the case of serialization, all stores and other operations associated with an instruction are completed before the next instruction is fetched from memory. After completing the instruction in the write stage, the flush is performed by clearing the valid bit in the first seven stages of the pipeline. Flushing also causes the contents of program counter register 94 to be loaded into program counter register 40. Serialization is used to reset the pipeline when the branch cache 46 has made an incorrect prediction. In parallel with serialization, the branch cache 46 is updated. When serialization is performed, all pending operations in the stack 56 are also flushed.

In the case of nullification of an instruction, no stores associated with an instruction are completed and program counter register 94 is not updated. Nullification is different from serialization in that all stages of the pipeline are flushed including the write stage 24. Hence, the instruction in the write stage is not allowed to be completed. Instructions can be tagged for nullification in any stage of the pipeline and when the tag instruction reaches the write stage 24, it is nullified.

The write stage 24 performs several different operations depending on the state of the processor. Continue is the normal operation where the program counter register 94 is incremented by the instruction length code (ILC) and instruction processing continues. If the branch cache 46 predicted an operation other than continue, then the pipeline is serialized (flushed) and the branch entry is invalidated/updated.

Idling occurs when no instructions are passing through the write stage 24 due to holes (empty stages) in the pipeline. When a hole passes through the write stage 24, the write stage idles. Stages are empty when their valid bit is reset. Hold is treated exactly like idle, except that it is due to a hold condition such as instruction buffer full.

Branching is performed by loading the program counter register 94 with the branch target address. Branch target addresses come from the EAF stage 16. Branch target addresses are passed from the EAF stage 16 to the write stage program counter register 94 through program counter registers 88, 90 and 92. If the branch cache 46 predicted an operation other than a branch, then the pipeline is serialized (flushed), and the branch cache entry is updated/invalidated.

Interpreter calls are performed by loading program counter register 94 with the entry address. Entry addresses come from the EAF stage 16. Entry addresses are passed from the EAF stage 16 to the program counter register 94 through program counter registers 88, 90 and 92. The old value of the program counter register 94 is incremented by the ILC and is pushed on to the stack 98. If the branch cache 46 predicted an operation other than an interpreter call, then the pipeline is flushed, and the branch cache entry is updated with the call prediction.

Traps cause a trap vector address to be loaded into the program counter register 94. The old program counter register 94 value is incremented by the ILC and is pushed onto the stack 98. Traps always cause the pipeline to be flushed.

Interpreter returns are performed by popping the return address from the top of the stack 98 and loading it into the program counter register 94. If the branch cache 46 predicted an operation other than an interpreter return, then the pipeline is serialized (flushed), and the branch cache entry is invalidated.

Branch cache updating/invalidating takes one processor cycle to perform and is performed in parallel with serialization (flushing) in the write stage 24. To perform a branch cache update, a tag address and a target address are required. The tag address is the address of the branch instruction. The target address is the target address of the branch instruction. The update is performed by addressing the branch cache 46 with the tag address and then loading both the tag address and the target address into the branch cache 46. Branch cache invalidating is similar, but only requires the tag address. The code for a normal prediction is written into the prediction-type field of the branch cache 46 during an invalidation.

Updating of the branch cache 46 with a call prediction is performed in a similar manner. The tag address is the address of the multicycle instruction. The target address is the entry address of the interpreter. Updating the branch cache 46 for a return prediction requires only the tag address of the return, since the return address is contained in the stack. The branch cache update is performed by the write stage 24. When an instruction completes execution in the write stage, the program counter register 94 contains the target address needed for the branch cache update. Updating also requires the prediction type from the operation code to be loaded into the specified branch cache address.

The downstream stages of the pipelined central processor are illustrated in block diagram form in FIG. 4. It will be understood that the instruction fetching and sequencing apparatus shown and described hereinabove can be utilized with different downstream pipeline configurations.

The instruction decoder 68 receives program instructions and microinstructions from the instruction fetching unit and assembles and decodes instructions on every cycle where possible. The decoder 68 provides the necessary controls to execute single-cycle instructions in one cycle and supports the microinstructions used to execute multicycle instructions. Included in the instruction decoder 68 are alignment hardware to extract instructions from a stream of evenly-addressed parcels from the instruction cache 42, logic to reduce the opcode into an address to instruction control RAMs, logic to reduce the opcode into control signals for the EAF stage 16, logic to reduce the opcode into three E-unit register addresses (one write register and two read registers), logic to reduce the opcode into two I-unit register addresses (base and index), conflict-/bypass detection for the I-unit registers and an 8K by 59 instruction control RAM to provide control signals for the sequencer, the operand cache, the execute unit and to generate an interpreter entry address and an execute unit microsequencer entry address.

Interpreter calls are made by the instruction decoder 68 when a multicycle instruction is detected in the instruction flow. The instruction decoder 68 provides an entry address into the interpreter and saves information in the instruction word which may be required by the interpreter (register file addresses, displacement, EAF information etc.). The entry address is sent to the EAF stage 16 for branch cache validation and possible update. On an incorrect prediction, the branch cache 46 must be updated and the pipeline must be flushed as described above.

In the effective address formation stage 16, a three-way addition between the base register or program counter word, number fields, index register word number and the displacement field extracted from the instruction is performed by a three operand arithmetic logic unit 122. Registers required for effective address formation, base, index and general registers are maintained in a triple port I-unit register file 120 which has two read ports and one write port. Also included in the EAF stage 16 is address staging. Since an interpreter routine may address relative to the effective address formation of the calling instruction, that address must be saved. The EAF stage 16 contains a program counter which is used for program counter relative addressing. The program counter in the EAF stage 16 is actually a pair of counters, the normal instruction counter and an interpreter counter. When the interpreter is entered, the normal counter is looped back onto itself and does not increment during interpreter routines. When the control is returned from the interpreter, the normal counter is incremented and the interpreter counter is not. Thus, a return from the interpreter simply entails a switch of counters, whereas a call to the interpreter requires a load to the interpreter counter and a switch of the counters. The arithmetic logic unit 122 has three basic input legs: base, index and displacement. The base and index legs are sourced from the instruction in the I unit register file 120, except when program counter relative addressing is in effect. In this case, the program counter offset field is coupled to EAF unit 74 (see FIG. 3), and the base leg is sourced from the program counter offset field. The displacement leg is sourced from the instruction decoder 68. The outputs of the arithmetic logic unit 122 are held in an EAF register 124.

The operand cache stage 18 includes an operand data cache and operand STLB 130. The operand data cache performs cache reads and writes, and the operand STLB performs virtual to physical address translation for cache operands. A store queue 132 buffers cache writes from the write stage 24 to the operand cache. The operand cache data is held in an operand buffer 134. The operand set select stage 20 includes operand format and alignment logic 140 which performs set selection and alignment on data from the operand stage. The results are held in an operand register 142.

The execute unit 22 performs the arithmetic and logical functions necessary to execute all instructions. It includes dedicated hardware for executing integer, floating point and decimal and character string instructions. The execute unit includes an E unit register file 150, a sequencer 152 and an execute unit control store 154. The arithmetic units are divided into an integer ALU 156, a floating point adder 158, a floating point multiplier 160, a divide unit 162 and a character and decimal unit 164. The outputs of these units are routed through a multiplexer 166 to an execute unit register 170. Most single-cycle and interpreter microinstructions are executed in one cycle. For these instructions, the sequencer 152 is used as a decoder. Most floating point instructions require multiple microinstructions, and the sequencer 152 is used to sequence through them. As described above, most multicycle instructions are handled by the interpreter in the instruction cache 42. However, it was found that floating point instructions may not operate efficiently when the interpreter described above is utilized, due to heavy data dependencies. Accordingly, floating point instructions are executed by the sequencer 152 and the E-unit control store 154 in the execute unit. Other instruction types reach the execute unit either as single cycle instructions or as interpreter microinstructions.

While there has been shown and described what is at present considered the preferred embodiments of the present invention, it will be obvious to those skilled in the art that various changes and modifications may be made therein without departing from the scope of the invention as defined by the appended claims.

What is claimed is:

1. Digital processing apparatus for executing stored program instructions including single-cycle instructions and multicycle instructions during multiple processing cycles, comprising:

instruction memory means for providing said program instructions in response to program addresses and for providing microinstructions of a multicycle instruction interpreter in response to microinstruction addresses;

prediction means responsive to different ones of said program addresses for making predictions of multicycle instructions and predictions of single cycle instructions, said predictions of multicycle instructions including predictions of calls to said instruction interpreter and predictions of returns from said instruction interpreter, said prediction means including a cache memory for storage and readout of said call predictions and instruction interpreter entry addresses respectively associated with each of said call predictions, each of said call predictions and said entry addresses being stored at an address corresponding to the program address for which the call prediction is made, and for storage and readout of each of said return predictions at an address corresponding to the microinstruction address for which the return prediction is made;

control means for providing successive program addresses to said instruction memory means for accessing said program instructions in response to predictions of single-cycle instructions and for providing successive microinstruction addresses to said instruction memory means in response to each prediction of a multicycle instruction until completion of the multicycle instruction interpreter, said control means including program counter means for holding a current address for accessing said instruction memory means on each processing cycle and for incrementing the current address on successive processing cycles, stack memory means coupled to said program counter means, control logic means responsive to each of said call predictions for loading a return program address from said program counter means into said stack memory means, and selector means responsive to each of said call predictions for loading the entry address into said program counter means and responsive to each of said return predictions for transferring said return program address from said stack memory means to said program counter means;

means responsive to said program instructions and said microinstructions provided by said instruction memory means for executing said program instructions and said microinstructions; and means for validating said predictions and for updating said prediction means when said predictions are incorrect.

2. Digital processing apparatus as defined in claim 1 wherein said prediction means comprises memory means that is addressed by said program addresses.

3. Digital processing apparatus as defined in claim 1 wherein said prediction means comprises a cache memory for storage and readout of each of said predictions at an address corresponding to the program address for which the prediction is made.

4. Digital processing apparatus as defined in claim 1 wherein said prediction means comprises a cache memory for storage and readout of each of said predictions and an associated entry address of said instruction interpreter at an address corresponding to the program address for which the prediction is made.

5. Digital processing apparatus as defined in claim 1 wherein said prediction means further includes means responsive to said program addresses for making predictions of branch instructions.

6. Digital processing apparatus as defined in claim 5 wherein said cache memory includes means for storage and readout of each of said branch instruction predictions and an associated branch instruction address at an address corresponding to the program address for which the branch prediction is made.

7. Digital processing appratus as defined in claim 6 wherein said prediction means includes means for making subroutine call predictions, subroutine return predictions and interpreter branch predictions within said interpreter.

8. Digital processing apparatus as defined in claim 7 wherein said cache memory includes a program section for storing interpreter call predictions and branch instruction predictions and an interpreter section for storing interpreter subroutine call predictions, interpreter subroutine return predictions, interpreter branch predictions and interpreter return predictions and wherein said control means includes means for providing an interpreter mode bit in said program addresses and said microinstruction addresses for selectively addressing said program section and said interpreter section of said cache memory.

9. Digital processing apparatus as defined in claim 1 wherein said control means includes means for providing microinstruction addresses starting on the processing cycle immediately after each of said predictions of multicycle instructions.

10. Digital processing apparatus as defined in claim 1 wherein said control means includes means for providing said entry address of said instruction interpreter to said instruction memory means on the processing cycle immediately after each of said call predictions.

11. Digital processing apparatus as defined in claim 1 wherein said prediction means further includes means responsive to said program addresses for making predictions of branch instructions.

12. Digital processing apparatus as defined in claim 11 wherein said cache memory includes means for storage and readout of said branch instruction predictions and branch instruction addresses respectively associated with each of said branch instruction predictions, each of said branch instruction predictions and said branch instruction addresses being stored at an address corresponding to the program address for which the branch instruction prediction is made.

13. Digital processing apparatus as defined in claim 12 wherein said selector means further includes means responsive to branch instruction predictions for loading said branch instruction address into said register means.

14. Digital processing apparatus as defined in claim 1 wherein said means for executing said program instructions includes means for decoding said program instructions and providing an operation code representative of the program instruction type and wherein said means for validating said predictions includes means for comparing each operation code with the associated prediction and providing an invalid prediction indicator when said prediction does not correspond to said operation code.

15. Digital processing apparatus as defined in claim 1 wherein said validating means includes means responsive to each of said program instructions for detecting a multicyle instruction on a processing cycle subsequent to the processing cycle on which said call prediction was made and providing a multicycle detected signal, and means for providing an invalid prediction indicator when said call prediction does not correspond to said multicycle detected signal.

16. In pipelined digital processor for executing a stored program including single-cycle instructions and multicycle instructions, instruction addressing apparatus comprising:

control means for providing a program address during a first processing cycle;

prediction means responsive to said program address for predicting a multicycle instruction and making an instruction interpreter entry prediction during said first processing cycle, said prediction means including means responsive to microinstruction addresses for making a prediction of a return from said instruction interpreter, said prediction means including a cache memory for storage and readout of said entry prediction and said entry address at a cache memory address corresponding to the program address for which the entry prediction is made and for storage and readout of said return prediction at a cache memory address corresponding to the microinstruction address or which the return prediction is made;

said control means further including means responsive to said prediction for providing during a second processing cycle an entry address of an instruction interpreter comprising a plurality of microinstructions and for providing successive microinstruction addresses during processing cycles subsequent to said second processing cycle; and instruction memory means responsive to said program address for providing said multicycle instruction during said second processing cycle, responsive to said entry address for providing a first microinstruction during a third processing cycle and responsive to said microinstruction addresses for providing microinstructions during processing cycles subsequent to said third processing cycle, said control means comprising program counter means for holding a current address for accessing said instruction memory means and for incrementing the current address on successive processing cycles, stack memory means coupled to said program counter means, control logic means responsive to said entry prediction for loading a return program address from said program counter means into said stack means, and selector means responsive to said entry prediction for loading said entry address into said program counter means and responsive to said return prediction for transferring said return program address from said stack memory means to said program counter means.

17. Instruction addressing apparatus as defined in claim 16 wherein said control means includes means for providing said entry address to said instruction memory means on said second processing cycle immediately following said first processing cycle.

18. Digital processing apparatus for executing a stored program including single-cycle instructions and multicycle instructions during multiple processing cycles, comprising:

instruction memory means responsive to program addresses for providing program instructions and responsive to microinstruction addresses for providing microinstructions of a multicycle instruction interpreter;

prediction memory means responsive to various ones of said program addresses corresponding to multicycle instructions for readout of instruction interpreter entry predictions and associated entry addresses and responsive to various ones of said microinstruction addresses for making predictions of returns from said instruction interpreter;

program counter means for holding a current address for accessing said instruction memory means and for incrementing the current address on successive processing cycles;

stacking memory means coupled to said program counter means, control logic means responsive to each of said call predictions for loading a return program address from said program counter means into said stack memory means;

selector means responsive to each of said call predictions for loading the associated entry address into said program counter means and responsive to each of said return predictions for transferring said return program address from stack memory means to said program counter means, means for executing said program instructions and said microinstructions; and means for validating each of said predictions and for updating said prediction memory means when one of said predictions is incorrect, said prediction memory means including a program section for storing interpreter call predictions and branch instruction predictions and an interpreter section for storing interpreter subroutine call predictions, interpreter subroutine return predictions, interpreter branch predictions and interpreter return predictions and wherein said control logic means includes means for providing an interpreter mode bit in said program addresses and said microinstruction addresses for selectively addressing said program section and said interpreter section of said prediction memory means.

19. Digital processing apparatus as defined in claim 18 wherein said prediction memory means further includes means responsive to said program addresses for making predictions of branch instructions.

20. Digital processing apparatus as defined in claim 19 wherein said prediction memory means includes means for storage and readout of said branch instruction predictions and branch instruction addresses respectively associated with each of said branch instruction predictions, each of said branch instruction predictions and said branch instruction addresses being stored at an address corresponding to the program address for which the branch instruction prediction is made.

21. Digital processing apparatus as defined in claim 20 wherein said selector means further includes means responsive to branch instruction predictions for loading said branch instruction address into said register means.

22. Digital processing apparatus as defined in claim 18 wherein said control logic means includes means for providing said entry address of said instruction interpreter to said instruction memory means on the processing cycle immediately after each of said call predictions.

23. A method for executing stored program instructions including single-cycle instructions and multicycle instructions during multiple processing cycles comprising the steps of:

storing program instructions and microinstructions of a multicycle instruction interpreter in an instruction memory;

providing successive program addresses to the instruction memory for accessing the program instructions;

making predictions of multicycle instructions based on the program addresses provided to the instruction memory, the step of making predictions of multicycle instructions including the steps of making call predictions for entering said instruction interpreter in response to multicycle instruction addresses, and making return predictions for returns from said instruction interpreter in response to specified microinstruction addresses, the step of making call predictions including the step of storing said call predictions in a cache memory at addresses corresponding to said multicycle instruction addresses and the step of making return predictions including the step of storing said return predictions in said cache memory at addresses corresponding to said specified microinstruction addresses;

interrupting the program addresses and providing successive microinstruction addresses to the instruction memory for accessing the microinstructions, in response to each prediction of a multicycle instruction; and executing the program instructions and the microinstructions, the steps of storing program instructions and microinstructions, and executing the program instructions and the microinstruction being performed in separate stages of a pipelined digital processor.

24. A method for executing stored program instructions as defined in claim 23 wherein the step of providing successive microinstruction addresses includes the step of providing to said instruction memory an entry address of the instruction interpreter on the processing cycle immediately following each of said call predictions.

25. A method for executing storage program instructions as defined in claim 24 further including the step of providing a return address to said instruction memory on the processing cycle immediately following each of said return predictions.

26. A method for executing stored program instructions as defined in claim 25 further including the step of making predictions of branch instructions based on the program instructions provided to the instruction memory.

27. Digital processing apparatus for executing stored program instructions including single-cycle instructions and multicycle instructions during multiple processing cycles comprising:

an instruction fetching stage comprising instruction memory means for providing said program instructions in response to program addresses and for providing microinstructions of a multicycle instruction interpreter in response to microinstruction addresses, prediction means responsive to different ones of said program addresses for making predictions of multicycle instructions and predictions of single cycle instructions, said predictions of multicycle instructions including predictions of calls to said instruction interpreter and predictions of returns from said instruction interpreter, said prediction means including a cache memory for storage and readout of said call predictions and instruction interpreter entry addresses respectively associated with each of said call predictions, each of said call predictions and said entry addresses being stored at an address corresponding to the program address for which the call prediction is made, and for storage and readout of each of said return predictions at an address corresponding to the microinstruction address for which the return prediction is made, and control means for providing successive program addresses to said instruction memory means for accessing said program instructions in response to predictions of single cycle instructions and for providing successive microinstruction addresses to said instruction memory means in response to each prediction of a multicycle instruction until completion of the multicycle instruction interpreter, said control means including program counter means for holding a current address for accessing said instruction memory means on each processing cycle and for incrementing the current address on successive processing cycles, stack memory means coupled to said program counter means, control logic means responsive to each of said call predictions for loading a return program address from said program counter means into said stack memory means, and selector means responsive to each of said call predictions for loading the entry address into said program counter means and responsive to each of said return predictions for transferring said return program address from said stack memory means to said program counter means;

an instruction decoder stage for decoding said single-cycle instructions, said multicycle instructions and said microinstructions;

an effective address formation stage responsive to outputs of said instruction decoder stage for determining addresses of operands referenced by said single-cycle instructions and said microinstructions;

an operand memory stage responsive to said operand addresses for providing operands referenced by said single-cycle instructions and said microinstructions;

an execute stage responsive to said operands provided by said operand memory stage and the outputs of said decoder stage for executing said single-cycle instructions and said microinstructions; and a writer stage for storing the results of said execute stage.

28. Digital processing apparatus as defined in claim 27 further including means for validating said predictions and means for updating said prediction means when said predictions are incorrect.

29. Digital processing apparatus as defined in claim 28 wherein said validating means includes a program counter register associated with each of said stages, means for advancing said predictions through said program counter registers and means for comparing instruction types provided by said instruction decoder stage with the predictions in the associated program counter register.

* * * * *